United States Patent
Maldonado

(10) Patent No.: US 8,474,231 B1
(45) Date of Patent: Jul. 2, 2013

(54) EDGING AND TRIMMING APPARATUS FOR ATTACHMENT TO LAWN MOWERS

(76) Inventor: Ralph Maldonado, Encinitas, CA (US)

( * ) Notice: Subject to any disclaimer, the term of this patent is extended or adjusted under 35 U.S.C. 154(b) by 0 days.

(21) Appl. No.: 13/506,055

(22) Filed: Mar. 24, 2012

(51) Int. Cl.
*A01D 34/00* (2006.01)

(52) U.S. Cl.
USPC .......................................... 56/13.7

(58) Field of Classification Search
USPC ............... 56/11.6, 12.7, 13.6, 13.7, 16.9, 256
See application file for complete search history.

(56) References Cited

U.S. PATENT DOCUMENTS

| | | | |
|---|---|---|---|
| 1,522,129 A * | 1/1925 | Jones et al. | 56/251 |
| 3,053,035 A * | 9/1962 | Earley | 56/256 |
| 3,125,165 A * | 3/1964 | Boudreaux et al. | 172/14 |
| 3,604,208 A * | 9/1971 | Borunda | 56/11.5 |
| 4,453,372 A * | 6/1984 | Remer | 56/13.7 |
| 4,478,028 A * | 10/1984 | Dawson, Jr. | 56/16.9 |
| 4,949,536 A * | 8/1990 | Neufeld | 56/13.7 |
| 5,048,276 A * | 9/1991 | Miller | 56/16.9 |
| 5,090,142 A * | 2/1992 | Peters | 37/243 |
| 5,167,108 A * | 12/1992 | Bird | 56/13.7 |
| 5,179,823 A * | 1/1993 | Pace | 56/16.9 |
| 5,303,534 A * | 4/1994 | Gray | 56/17.5 |
| 6,434,920 B1 * | 8/2002 | Keane | 56/16.9 |
| 7,658,057 B1 | 2/2010 | O'Dell | |
| 7,900,428 B1 | 3/2011 | Maldonado | |

OTHER PUBLICATIONS

U.S. Appl. No. 13/374,936, Maldonado.

* cited by examiner

*Primary Examiner* — Thomas B Will
*Assistant Examiner* — Mai Nguyen
(74) *Attorney, Agent, or Firm* — Dennis W. Beech

(57) ABSTRACT

The present invention is an edging and trimming apparatus for attachment to lawn mowing machines for use to edge and trim grass and weeds. A gear assembly enclosed in a housing may have a drive gear attached to a drive shaft of a lawn mower and may be engaged with a driven gear attached to a driven end of a shaft. A socket end of the shaft may be positioned in a hole in a side wall of a blade housing and the shaft may be slidably attached to the blade housing by a first bracket and a second bracket to position the shaft approximately orthogonal to the drive shaft. A head coupling assembly with a trimmer head may be releasable attached to said socket end.

10 Claims, 7 Drawing Sheets

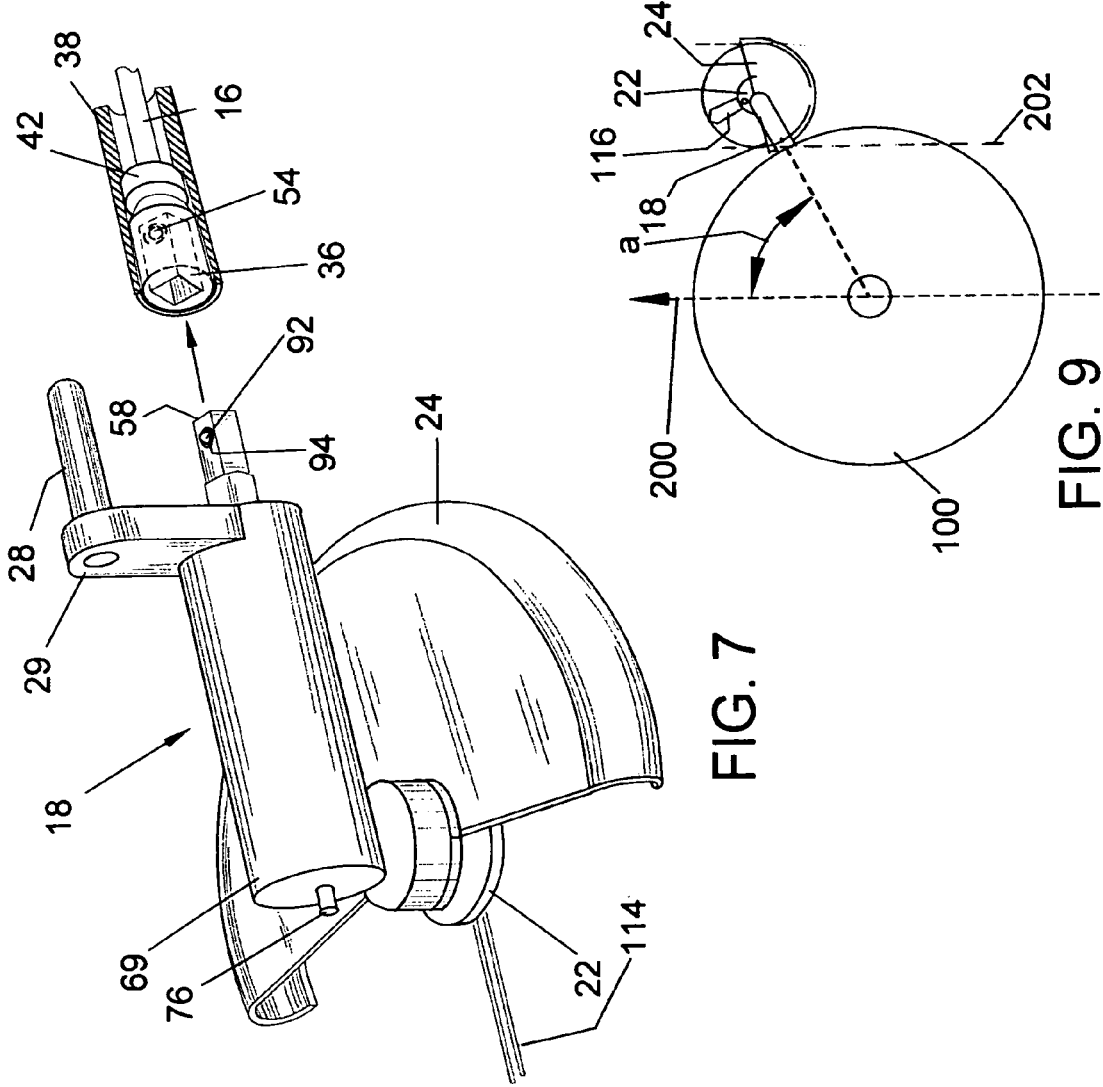

EDGING AND TRIMMING APPARATUS FOR ATTACHMENT TO LAWN MOWERS

BACKGROUND OF THE INVENTION

This invention relates to apparatus for attachment to lawn mowing machines for use to edge and trim grass and weeds at the edges of a lawn and grass area or adjacent to obstacles. The new apparatus attaches to a mower blade housing to extend outwardly from the side of a mower to rotate a cutting element adjacent the perimeter of the mower blade housing. The apparatus may be linked to the cutting blade power system of a lawn mower.

Edging and trimming apparatus for lawn mowers may currently be known. Specially designed apparatus for use with lawn mowers may use the lawn mowers power source or engine. A planar disc may be attached to the top of a grass cutting blade that is attached to the drive shaft of the mower engine. When the disc is rotated by the cutting blade rotation, a shaft having a rotatable end may be positioned to contact the surface of the rotating disc. Based on the friction contact between the disc surface and the shaft rotatable end and linkage structure to a cutting head, the cutting head may be caused to spin to rotate cutting strings for cutting grass. To the extent the disk and rotating shaft are exposed to cut grass and debris, apparatus operation may be compromised. This type of structure may be inefficient due to the need for efficient friction contact between the shaft and the disc. Other elements of linkage may overcomplicate the simple, efficient operation of a trimmer head attached to a lawn mower.

SUMMARY OF THE INVENTION

The present invention is directed to apparatus for attachment to lawn mowing machines for use to edge and trim grass and weeds. A gear assembly enclosed in a housing may have a drive gear attached to a drive shaft of a lawn mower and may be engaged with a driven gear attached to a driven end of a shaft. A socket end of the shaft may be positioned in a hole in a side wall of a blade housing and the shaft may be slidably attached to the blade housing by a first bracket and a second bracket to position the shaft approximately orthogonal to the drive shaft. A head coupling assembly with a trimmer head may be releasable attached to said socket end.

These and other features, aspects and advantages of the present invention will become better understood with reference to the following drawings, description and claims.

BRIEF DESCRIPTION OF THE DRAWINGS

FIG. 7 illustrates a perspective top view of a head coupling assembly and trimmer head positioned for insertion in a socket end of a shaft according to an embodiment of the invention;

FIG. 8 illustrates a side cross section view of a fifth portion of a coupling shaft according to an embodiment of the invention;

FIG. 9 illustrates a schematic top plan view of a blade housing with a trimmer head attached according to an embodiment of the invention.

DETAILED DESCRIPTION

Figure 1:
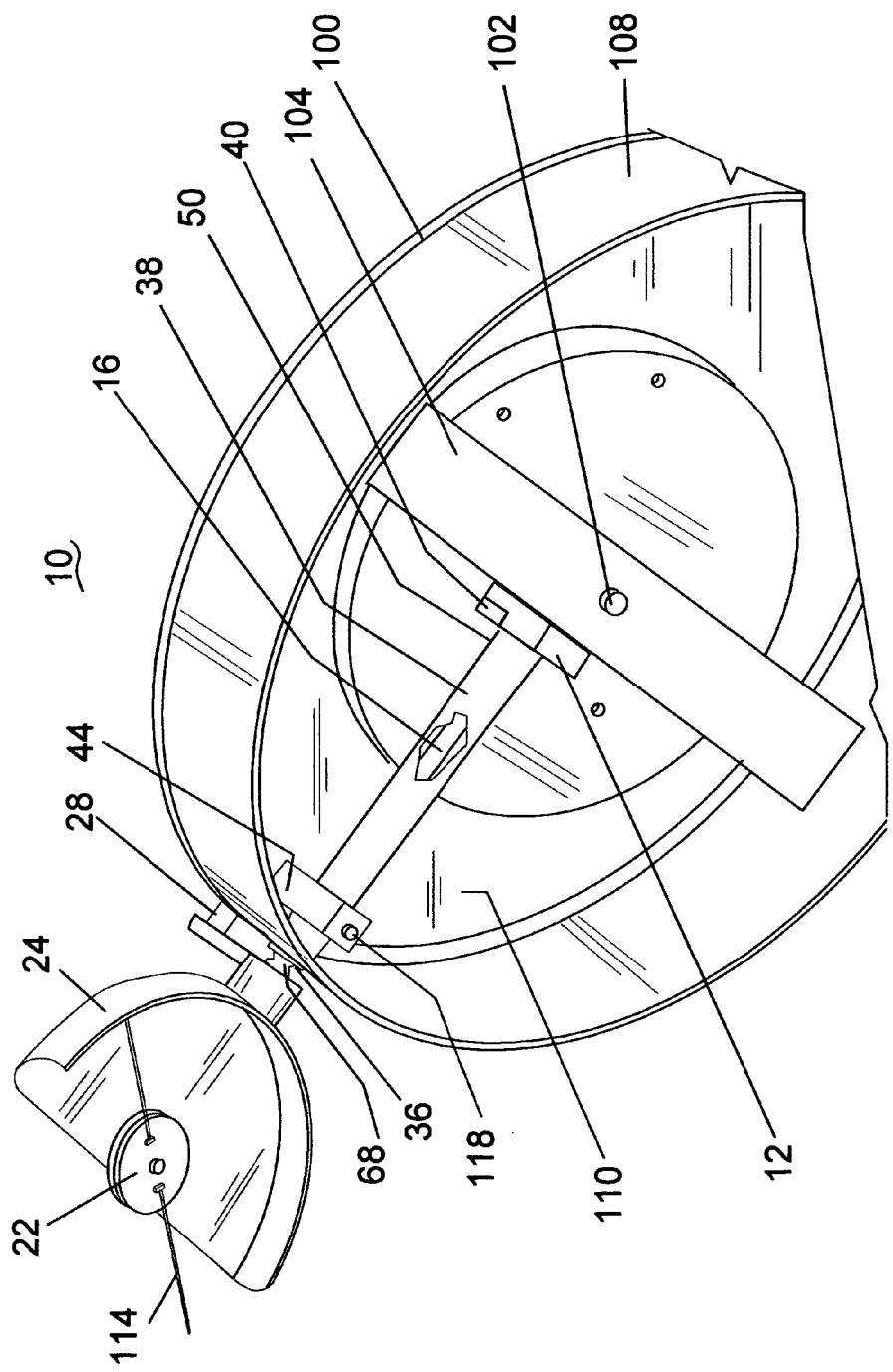
FIG. 1 illustrates a perspective bottom view of an edging and trimming apparatus attached to a lawn mower blade housing and drive shaft according to an embodiment of the invention.
Figure 2:
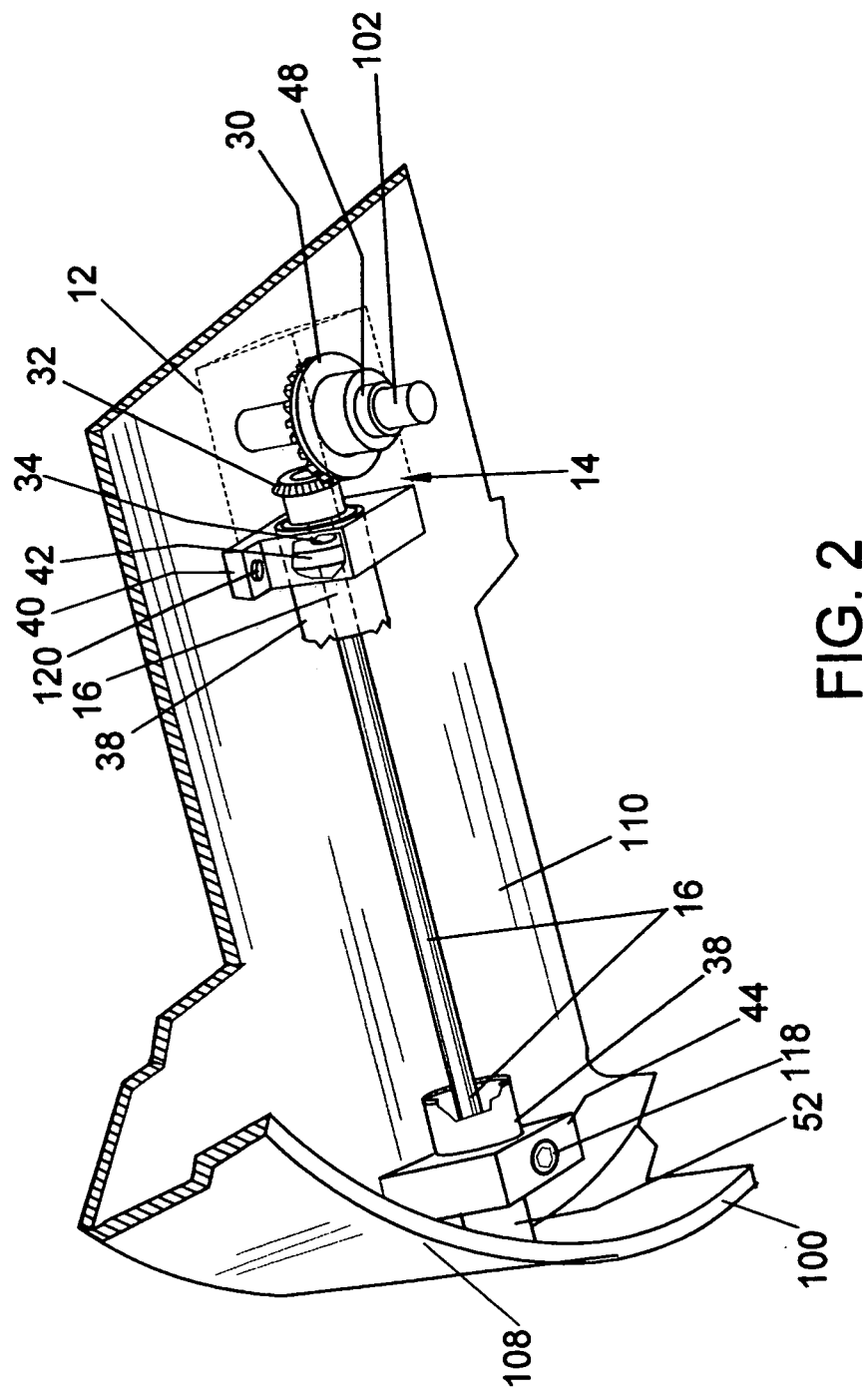
FIG. 2 illustrates a perspective bottom view of a shaft and gear assembly attached to a lawn mower blade housing and drive shaft according to an embodiment of the invention.
Figure 3:
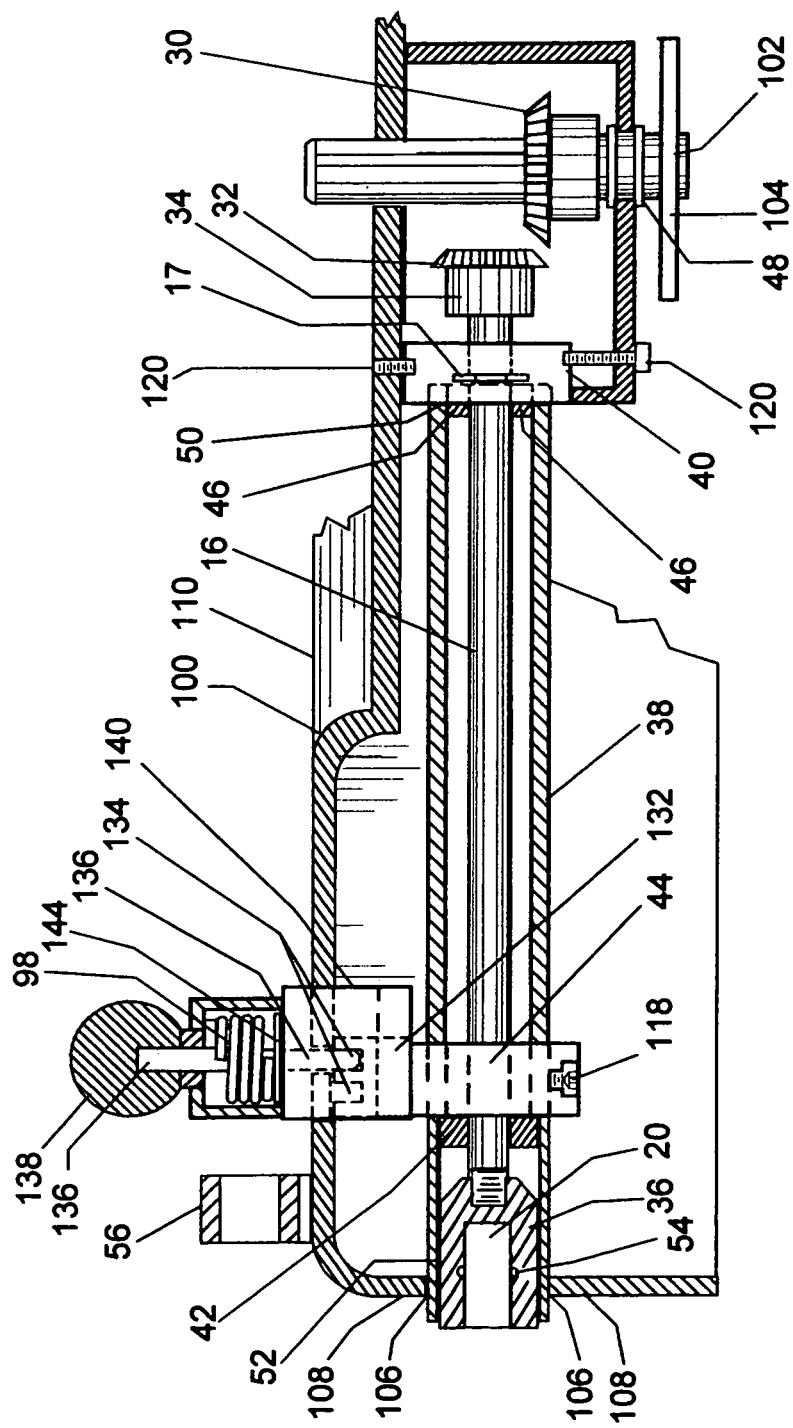
FIG. 3 illustrates a side partial cross section view of a blade housing and shaft with trimmer tube according to an embodiment of the invention.
Figure 4:
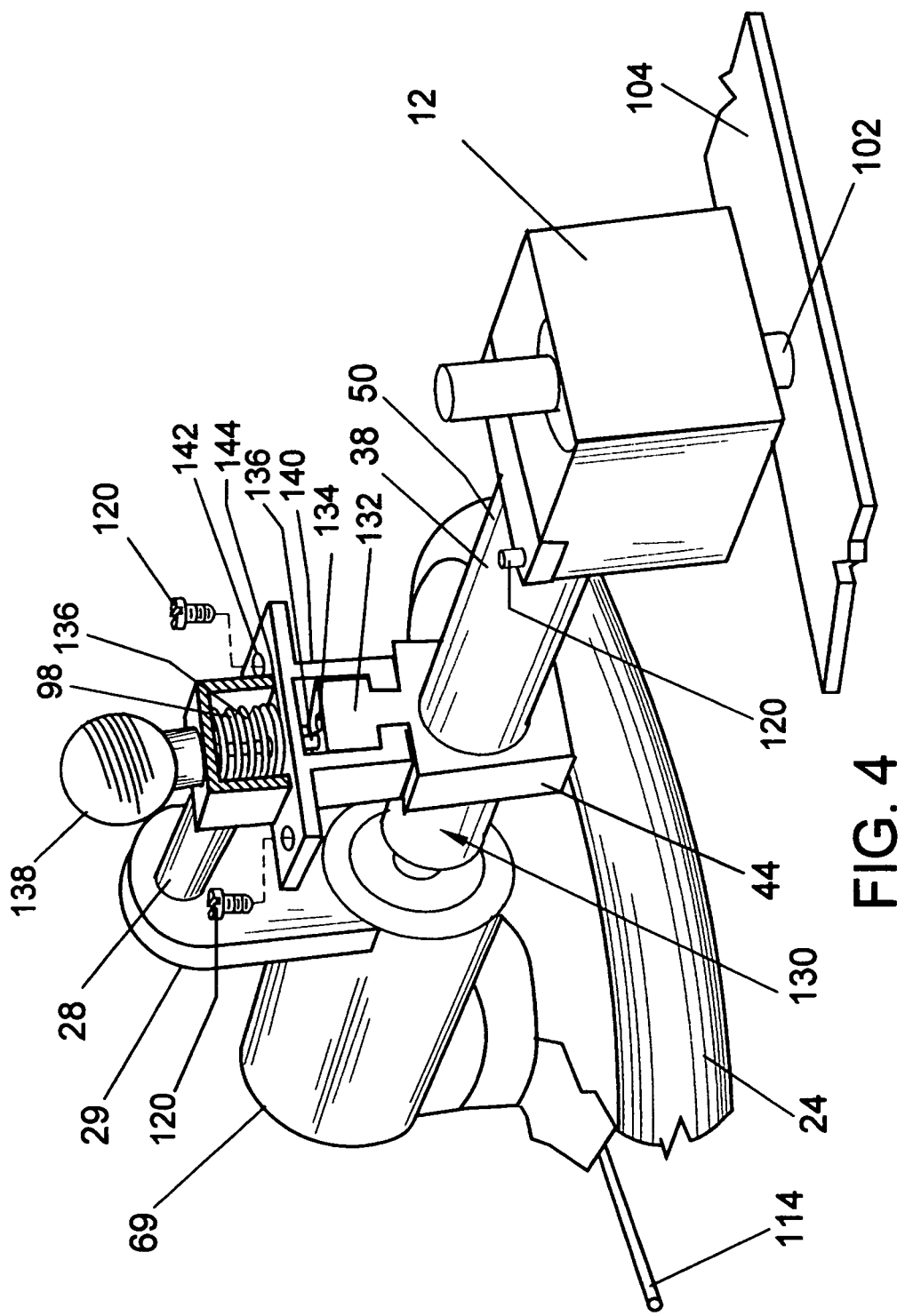
FIG. 4 illustrates a perspective upper view of an edging and trimming apparatus with a partial view of a drive shaft and blade according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 4 and 9, an edging and trimming apparatus 10 for attachment to lawn mowers may be used with lawn mowers that have a blade housing 100 with a motor (not shown) that drives a drive shaft 102 to rotate one or more rotor blades 104 positioned in the blade housing 100 and attached to the drive shaft 102. The apparatus 10 may have a gear housing 12 with a gear assembly 14 therein that is preferably a bevel gear to translate the rotary motion of the drive shaft 102 approximately orthogonally to a shaft 16 to transmit rotary motion through a hole 106 in the side wall 108 of the blade housing 100. A head coupling assembly 18 with a trimmer head 22 and trimmer guard 24 may be releasably attached to a socket end 36 attached to the shaft 16 at a shaft socket end 20.

The apparatus 10 positions a trimmer head 22 with cutting cord 114 or cutting blade 116 adjacent to the side wall 108 of the blade housing 100. When a lawn mower having the trimming apparatus 10 attached is operated to cut grass, the trimming apparatus 10 can be used to trim the grass generally at the edges of a lawn and grass area or adjacent to obstacles as well as to extend the cutting width of the mower. The trimmer head 22 may be positioned at an acute angle "a" relative to the direction of travel 200 of a lawn mower to avoid leaving a line 202 of uncut grass when trimming, see FIG. 9.

The gear housing 12 may be attached to the top wall 110 interior to the blade housing 100 or may be attached to a first bracket 40. The gear assembly 14 may have a driving gear 30 attached to the drive shaft 102 above the position on the drive shaft 102 where the rotor blades 104 are attached. A driven gear 32 may be attached adjacent to a driven end 34 of the shaft 16 positioned for engagement with the driving gear 30. The driving gear 30 and driven gear 32 gear ratio may be chosen for a particular lawn mower to optimize the RPM of the shaft 16 for a desired cutting or trimming speed for the trimmer head 22. There may be a first bracket 40 attached to the top wall 110 adjacent the gear housing 12 and a second or T-slide bracket 44 with a T-slide member 132 slidably engaged with a T-slide channel 140 of a bracket position housing 142 attached to the top wall 110 adjacent the side wall 108 for support of the trimmer tube 38 and the shaft 16 for rotation to transmit rotary motion to a socket end 36 attached to the shaft 16. The shaft 16 may be routed through the trimmer tube 38 that may be slidably inserted at a first end 50 at the first bracket 40 and at a second end 52 to the second bracket 44.

A second bearing 42 may be positioned in the second end 52 of tube 38 and a first bearing 46 may be positioned in the first end 50 of the tube 38 to support rotational motion of shaft 16 in tube 38. There may be a catch ring 17 attached to shaft 16 adjacent the first bearing 46 to inhibit longitudinal movement of the shaft 16 and first bearing 46 in tube 38. Screws 120 may be used to attach the bracket 40, tube position device 130, gear housing 12 and other elements, or welding may also be used. The trimmer tube 38 may inhibit debris and grass from interfering with the shaft 16 operation. There may be a housing sealing grommet 48 positioned in the drive shaft hole 112 of the gear housing 12 to seal around drive shaft 102.

The trimmer tube 38 may be slidably inserted in the first bracket 40 and may be attached by a set screw 118 in the T-slide bracket 44 at the second end 52. This may allow the trimmer tube 38 to slide along its longitudinal axis for engagement and disengagement of the driven gear 32 with the driving gear 30. This may allow a lawn mower user to activate the head coupling assembly 18 and trimmer head 22 by moving the trimmer tube 38 to engage and disengage the gears 32, 34 rather than having to disconnect the coupling assembly 18 when use is not needed.

The T-slide bracket 44 may have T-slide member 132 slidably engaged in the T-slide channel 140 of the tube position device 130. The T-slide member 132 may have position bores 134 therein for insertion of a pin 136 to retain the T-slide bracket 44 in an engaged or disengaged position to hold the trimmer tube 38 in position for the driven gear 32 to be engaged or disengaged with the drive gear 30. The position pin 136 may be spring biased by a spring 98 to remain in a position bore 134. The spring 98 may be retained on the position pin 136 by a circular clip type washer 144 in housing 142. A grip 138 may be attached to the position pin 136 for ease in pulling the pin 136 from a position bore 134. The tube position device 130 may be assembled in a housing 142 that may extend through and be attached to the top wall 110 of the blade housing 100.

Referring to FIGS. 1 and 4 through 7, the head coupling assembly 18 may have a housing 69 with a cylindrical shaft 60 positioned therein for rotation on a first coupling bearing 66 and a second coupling bearing 67. The coupling shaft 60 may have a first portion 62 with an outside diameter for receipt of a coupling gear 150 and gear body 154 for positioning to engage with a head gear 152 on a head shaft 156. The coupling gear 150 may be press attached to the first portion 62 of coupling shaft 60 that may have a keyway formed therein or a set screw 118 may be used for attachment. The head shaft 156 may be attached to the trimmer head 22 at a first end and the head gear 152 attached at the second end. The second portion 63 of the coupling shaft 60 may have an outside diameter for insertion in trimmer bearing 66 and a third portion 64 may span the distance between the trimmer bearing 66 and the coupling bearing 67. A fourth portion 65 of the coupling shaft 60 may have an outside diameter for insertion through the coupling bearing 67 to extend outwardly from the coupling housing 69 at a coupling end 71 for the coupling shaft 60 to end in a fifth portion 68 shaped for insertion in a socket end 36 of the shaft 16.

The coupling shaft 60 may have coupling bore 70 therethrough with an open first end 57 for receipt of a releasable attachment shaft 72. A release pin end 76 of the attachment shaft 72 may protrude outwardly from the coupling housing 69 to allow pushing the attachment shaft 72 inwardly for engagement or disengagement of the head coupling assembly 18. The attachment shaft 72 may have a first groove 74 space a distance from the release pin end 76 and a second groove 78 adjacent a locking end 80.

There may be a catch ring bore 84 with a diameter larger than the coupling bore 70 formed in the coupling bore 70 positioned to receive a catch ring 86 positioned in the first groove 74 to retain the attachment shaft 72 in the coupling bore 70. The catch ring bore 84 may be long enough to allow lateral movement of the attachment shaft 72 in the coupling bore 70. There may be a ball lock hole 88 formed in the wall 90 of the fifth portion 68 of coupling shaft 60. A ball 92 may be positioned in the lock hole 88 and retained by a lock ring 94 in a groove 96. There may be a spring 98 positioned in the coupling bore 70 between the locking end 80 of the attachment shaft 72 and a closed shaft end 58 of the coupling shaft 60.

In operation the spring 98 biases the attachment shaft 72 against the catch ring 86 to urge the ball 92 into the ball lock hole 88 for a portion of the ball to extend outwardly of the shaft end 58. The exposed portion of the ball 92 may be positioned in a detent 54 of the socket end 36 of the shaft 16 to couple the head coupling assembly 18 to the shaft 16. To remove the head coupling assembly 18, trimmer head 22 and trimmer guard 24, the release pin end 76 may be pushed against the force of the spring 98 to urge the ball 92 into the release or second groove 78 to disengage the ball 92 from the detent 54.

Figure 5:
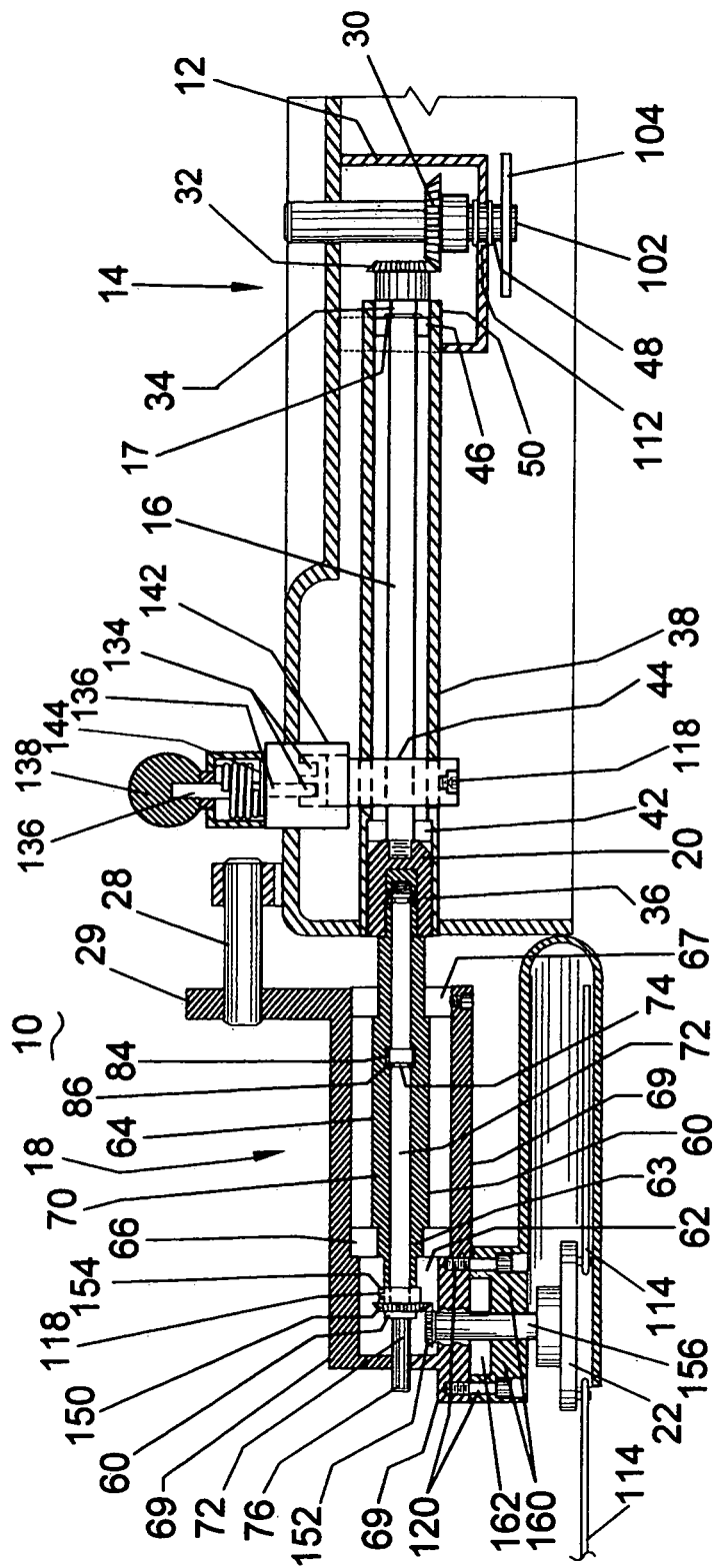
FIG. 5 illustrates a side partial cross section view of a shaft and gear assembly attached to a lawn mower blade housing and drive shaft with head coupling assembly attached according to an embodiment of the invention.
Figure 6:
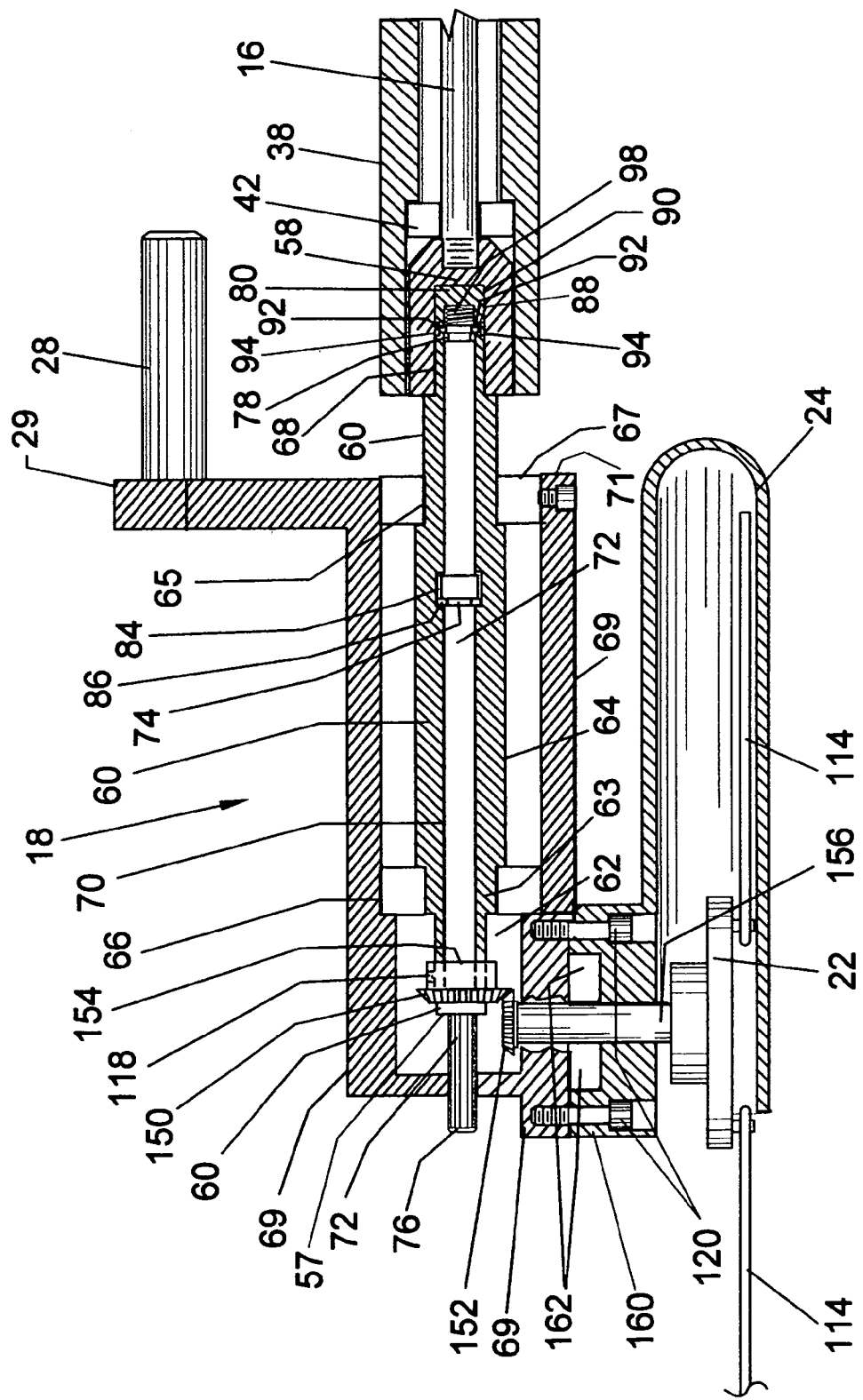
FIG. 6 illustrates a side partial cross section view of a head coupling assembly according to an embodiment of the invention.

There may be an anti-rotation pin 28 attached to a rotation bracket 29 to project outwardly from the coupling housing 69 for engagement with an anti-rotation bracket 56 attached to the top wall 110 of the blade housing 100 when the head coupling assembly 18 is coupled with the shaft 16, see FIG. 5. The elements of the head coupling assembly 18 and the anti-rotation pin 28 may allow ease of installation of the trimmer head 22 and trimmer guard 24 for use with a lawn mower when trimming is desired and removal when not requiring edge trimming.

There may be a bearing housing 160 portion of the trimmer guard 24 that has a head bearing 162 positioned therein in which the head shaft 156 is rotatably attached. The bearing housing 160 may be attached to the coupling housing 69 with fasteners or screws 120 to position the trimmer head 22, trimmer guard 24 and cutting cord 114 for cutting adjacent the blade housing 100.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus for attachment to lawn mowing machines for use to edge and trim grass and weeds comprising:
   a gear assembly in a gear housing disposed in a blade housing with a driving gear attached to a drive shaft and engaged with a driven gear attached to a driven end of a shaft wherein said shaft is disposed approximately orthogonal to said drive shaft;
   a trimmer tube with said shaft disposed therein with said driven end disposed in a first bearing in a first end of said trimmer tube and a shaft socket end of said shaft disposed in a second bearing in a second end of said trimmer tube;
   a first end of said trimmer tube is slidably disposed in a first bracket disposed in said gear housing and a second end of said trimmer tube is slidably disposed in a side wall having an aperture therein wherein said trimmer tube adjacent said second end is attached to a second bracket that has a T-slide member slidably disposed in a T-slide channel of a tube position device that comprises a bracket position housing with said T-slide channel disposed for slidable receipt of said T-slide member and said T-slide member having position bores therein located for insertion of a spring biased position pin that is slidably disposed in said bracket position housing; and a head coupling assembly with a trimmer head has a coupling shaft with a third portion shaped for insertion in said socket end and is releasably attached to said shaft socket end.

2. The apparatus as in claim 1 wherein said gear assembly is a beveled gear assembly with a pair of toothed wheels.

3. The apparatus as in claim 1 wherein a trimmer guard is attached to said head coupling assembly.

4. The apparatus as in claim 1 wherein an anti-rotation pin is attached and disposed on said head coupling assembly to engage an anti-rotation bracket attached to said blade housing.

5. The apparatus as in claim 1 wherein said second end of said trimmer tube is disposed in said side wall for said trimmer head to cut at an acute angle relative to a direction of travel of said blade housing.

6. The apparatus as in claim 1 wherein a housing sealing grommet is positioned in said gear housing having a shaft aperture therein through which said drive shaft extends.

7. The apparatus as in claim 1 wherein said head coupling assembly comprising:

said coupling shaft with a first portion having a coupling gear attached and disposed to engage a head gear attached to a head shaft that is attached to said trimmer head;

a second portion of said coupling shaft is disposed in a first coupling bearing disposed in said coupling housing;

said third portion of said coupling shaft is disposed between said first coupling bearing and a second coupling bearing positioned in a coupling end of said coupling housing;

a fourth portion of said coupling shaft is disposed in a said second coupling bearing and extends outwardly from said coupling housing at said coupling end to terminate in a fifth portion with a closed end shaped for insertion in said shaft socket end;

said coupling shaft has a coupling bore longitudinal disposed therein open at a first end and closed at said closed end;

an attachment shaft with a first groove spaced apart from a release pin end with a catch ring disposed in said first groove and with a second grove adjacent a locking end is slidably disposed in said coupling bore for said catch ring to be disposed in a catch ring bore formed in said coupling bore;

a wall of said fifth portion of said coupling shaft having a ball lock hole therein with a ball disposed in said ball hole and retained by a lock ring disposed in a lock groove to allow a portion of said ball to protrude outwardly of said ball lock hole; and a spring disposed in said coupling bore between said locking end of said attachment shaft and said closed end of said coupling shaft.

8. The apparatus as in claim 7 wherein said coupling shaft is cylindrical.

9. The apparatus as in claim 7 wherein said fifth portion has an exterior quadrilateral shape.

10. The apparatus as in claim 7 wherein said head shaft is disposed in a head bearing positioned in a bearing housing that is attached to said coupling housing.

* * * * *